Dec. 30, 1969    W. H. COCHRAN ET AL    3,486,325
RESET MECHANISM FOR PARKING METER
Filed Nov. 6, 1967    3 Sheets-Sheet 1

INVENTORS.
ROBERT F. DEIKE and
WILLIAM H. COCHRAN
BY C. Harvey Gold
THEIR ATTORNEY INVENTORS.
ROBERT F. DEIKE and
WILLIAM H. COCHRAN
BY
THEIR ATTORNEY United States Patent Office 3,486,325
Patented Dec. 30, 1969

3,486,325
RESET MECHANISM FOR PARKING METER
William H. Cochran, 3419 McComb Ave., and Robert
F. Deike, 2108 Pioneer Ave., both of Cheyenne, Wyo.
82001
Continuation-in-part of abandoned application Ser. No.
637,466, May 10, 1967. This application Nov. 6, 1967,
Ser. No. 680,710
Int. Cl. G07c 1/30
U.S. Cl. 58—142                                              5 Claims

ABSTRACT OF THE DISCLOSURE

An escapement mechanism for a parking meter having a timing clock which comprises a first clock drive gear which moves out of driving relationship with a co-acting second drive gear to allow the stored energy used to drive the clock escapement mechanism to escape when a vehicle enters into or leaves the parking space controlled by the meter. The first clock driving gear can be journaled to an activation lever pivotally mounted within the parking meter so that said gear is positioned away from the second drive gear when the activation lever is moved about its pivot with a pressure bellows.

This is a continuation-in-part of our now abandoned United States patent application Ser. No. 637,466, filed May 10, 1967.

This invention relates to an escapement mechanism for parking meters, and in particular, to a mechanism for resetting parking meters to zero time.

In recent years parking meters have become popular revenue obtaining devices. However, such meters cannot sense when one vehicle leaves the parking space which they control and when another vehicle arrives. Accordingly, any time remaining on the meter when the second vehicle arrives is credited to said second vehicle. This, of course, results in a substantial revenue loss during a relatively short time considering the total number of meters in many cities. In our co-pending United States patent application, Ser. No. 637,466, a pneumatic pressure pad system is described for activating a parking meter reset lever when a vehicle enters or leaves the parking zone controlled by the meter. This system includes at least one pressure pad positioned to be depressed by the wheel of a vehicle in the parking zone. Whenever a predetermined pressure is placed on the pad, a pressure surge is imparted to a bellows which converts the surge to a mechanical movement for activating a parking meter reset mechanism. While many types of escapement mechanisms can be used in connection with our pressure system, we have invented an escapement or a reset mechanism which is particularly adapted to be used in connection with most conventional parking meters which have a mechanical timing clock contained therein for regulating the parking period.

Accordingly, it is a principal object of this invention to provide a reset mechanism for parking meters with a mechanical clock which releases any energy stored in the meter for driving the clock and resets the meter time indicator to "zero" time, which mechanism is simple to design, inexpensive to construct, and easy to install within the parking meter without requiring substantial meter modification.

Briefly, the invention relates to an escapement mechanism for parking meters having a timing clock. The mechanism comprises an activation lever having a gear journaled thereto which is part of the meter's timing clock gear chain. When the gear is in a drive position, the parking meter's clock operates in a conventional fashion. However, when the activation lever is moved the drive gear is shifted away from a second gear which it drives thereby allowing the clock to run down to zero time. Preferably, the lever is activated or moved with a bellows which is activated with a pressure impulse sent to the bellows when a vehicle enters or leaves the parking space controlled by the meter.

So that the invention may be more readily understood and carried into effect, reference is made to the accompanying drawings.

Figure 1:
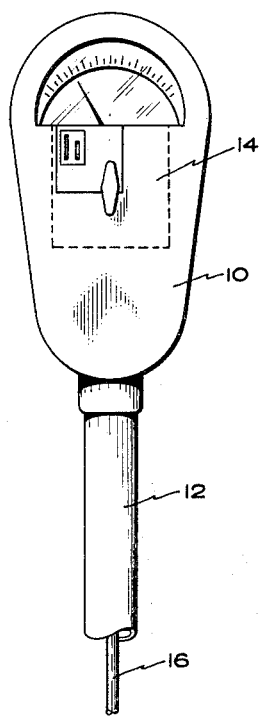
Figure 2:
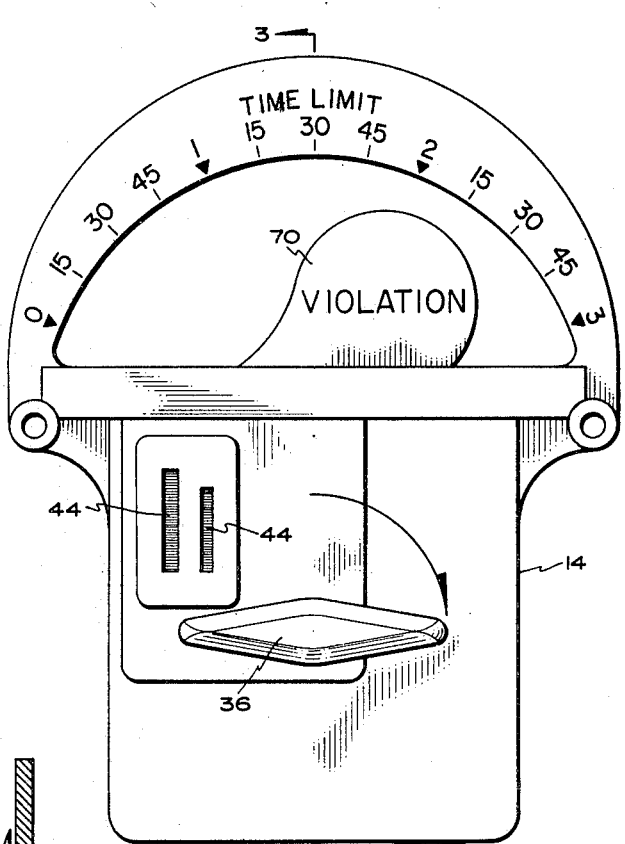
Figure 3:
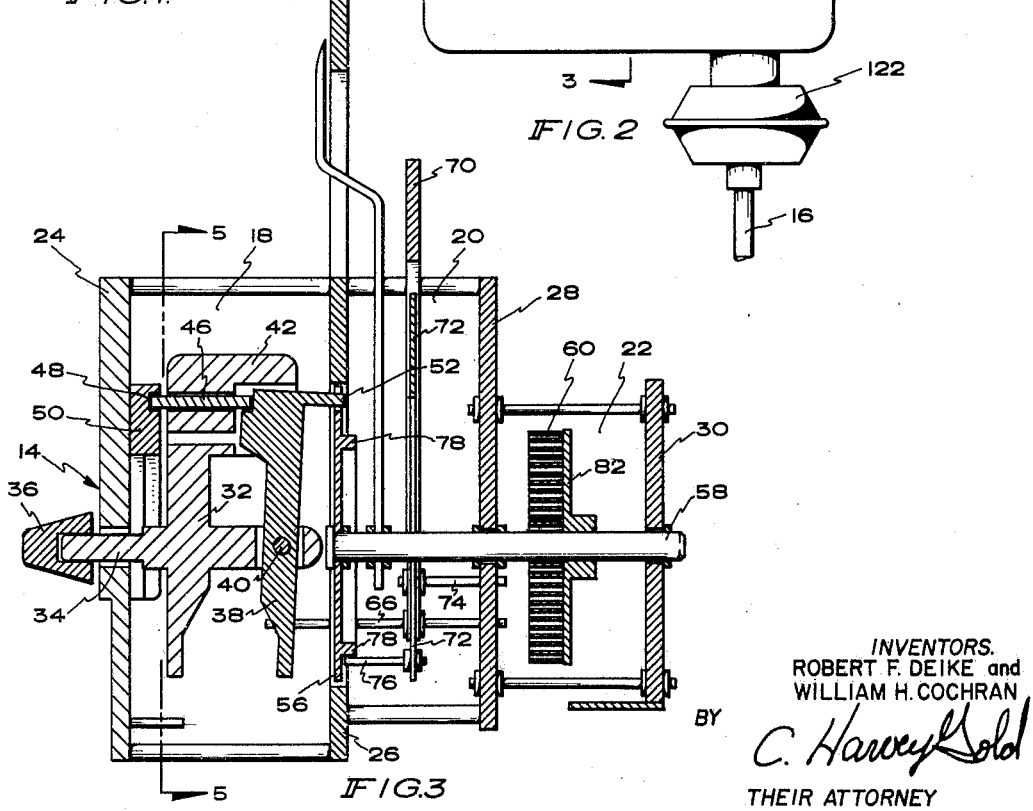
Figure 4:
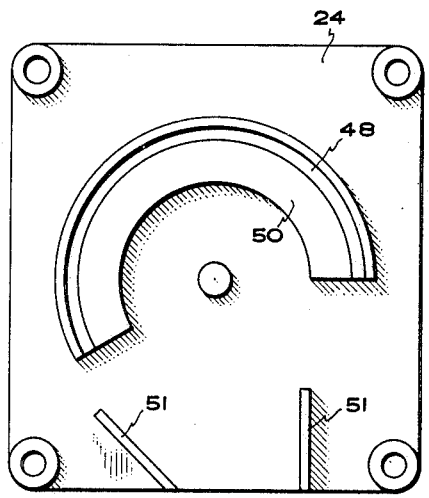
Figure 5:
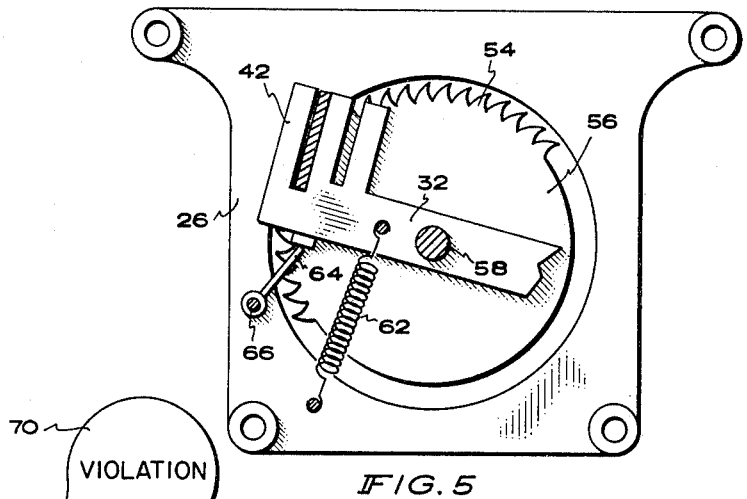
Figure 6:
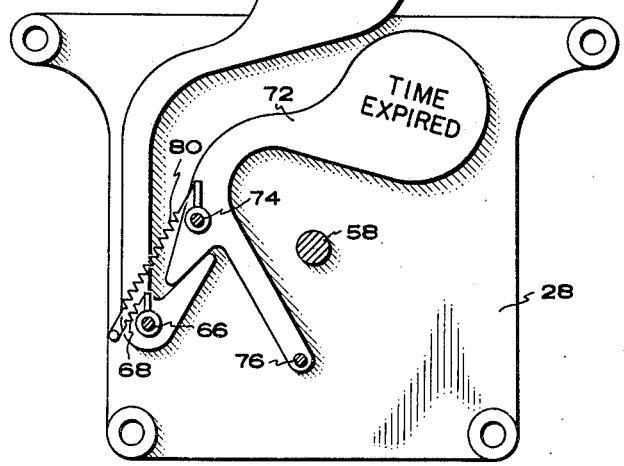
Figure 7:
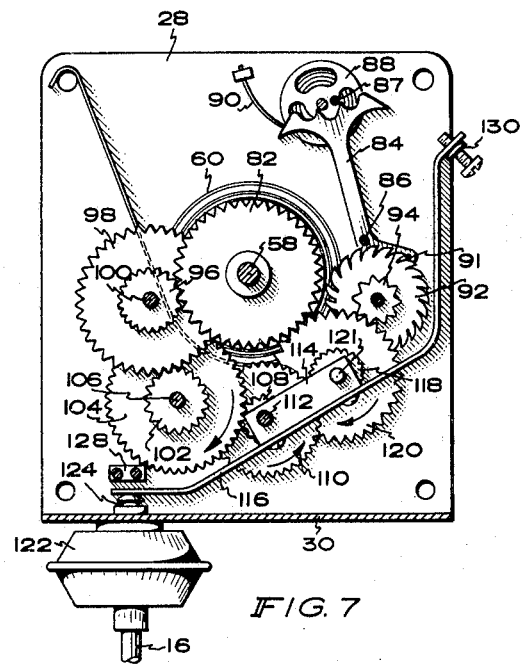
Figure 9:
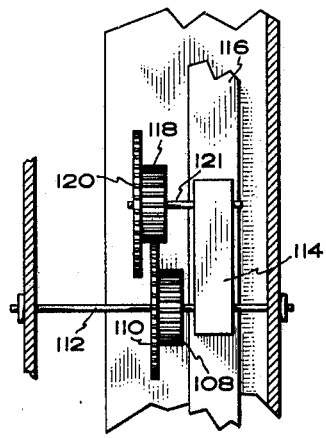
Figure 8:
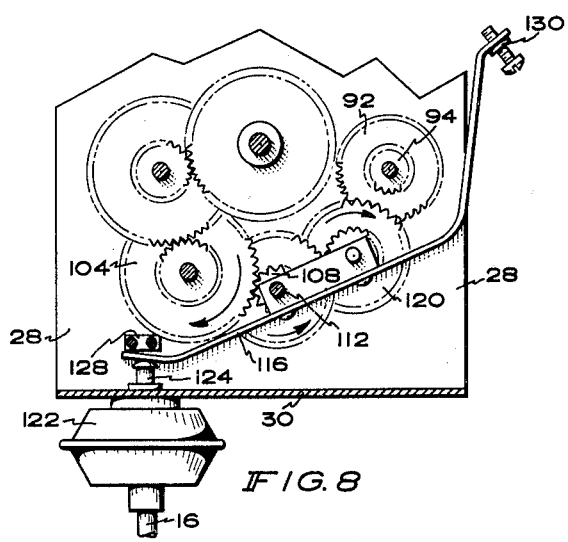

In the drawings:
FIG. 1 is a plan elevation view of a conventional parking meter containing the reset mechanism of this invention.
FIG. 2 is a plan elevation view of the coin activated metering portion of a parking meter.
FIG. 3 is a sectional view of FIG. 2 taken along the plane of line 3—3. For purposes of clarity a portion of the meter's timing mechanism has been omitted.
FIG. 4 is a plan elevation view of the front wall of the meter's winding chamber particularly showing the raised coin guides.
FIG. 5 is a partial plan elevation view of the back wall of the meter's winding chamber.
FIG. 6 is a plan elevation view of the back wall of the meter's indicator chamber.
FIG. 7 is a plan elevation view of the front wall of the meter's timing chamber showing the reset mechanism of this invention.
FIG. 8 is a partial plan elevation view of the front wall of the meter's timing chamber showing the reset mechanism rotated to a position which allows the timing clock to run down.
FIG. 9 is a partial top view of the reset lever of this invention rotatably mounted between the timing chamber's side walls.

Referring now more particularly to the drawings, in FIG. 1 there is shown a parking meter 10 adapted to be supported in an upright position with pole 12. The metering mechanism 14 of the meter, hereinafter described in detail, can be connected to tube 16 which conveys a pressure surge to said metering mechanism for activating its reset device.

The metering mechanism 14 shown in the drawings contains winding chamber 18, indicator chamber 20, and timing chamber 22. Winding chamber 18 houses the coin activated winding lever between supporting walls 24 and 26, metering chamber 20 which is bounded by supporting walls 26 and 28 houses the parking meter indicating arms and timing chamber 22, bounded by rear supporting walls 28 and interior supporting wall 30, houses the clock mechanism used to time the movement of the indicating arms.

The winding mechanism used to activate the clock within the timing chamber of the meter generally comprises a lever 32 attached to shaft 34 journaled to the front supporting wall 24 of winding chamber 18. Handle 36 is secured to the end of shaft 34 which protrudes through said wall 24 for rotating lever 32 and activation lever 38 is pivotally connected with pin 40 to the end of said shaft 34. Coin receiving box 42 is attached to one end of lever 34 is positioned to receive coin 46 which is passed into winding chamber 18 through a slot 44 provided in wall 24.

When a coin is positioned in the coin receiving box 42, lever 32 is rotated by turning handle 35 to move coin 46 into slot 48 in coin guide 50. As the coin moves into guide 50 it is urged away from support face 24 and towards support 26 and contacts one end of lever 38 to urge outward-winding tooth 54 of winding wheel 56 thereby transmitting rotational winding movement from handle 36 to wheel 56. Winding wheel 56 is fixedly connected to one end of shaft 58. Accordingly, when wheel 56 is rotated this movement is imparted to shaft 58 which in turn winds clock spring 60 to activate the meter's clock in a fashion hereinafter described. When handle 36 has been rotated a predetermined distance coin 46 falls out of coin guide 50 and into a coin retaining box 51 for retrieval. Lever 32 is then returned to its original position with spring 62.

When handle 36 is rotated to wind clock spring 60, coin box 42 is lifted away from lever 64 which is secured to shaft 66 thereby allowing the shaft to rotate due to the rotational force applied thereto by spring 68 connected to shaft 66 as shown in FIG. 6. Violation indicator 70, which is also secured to shaft 66, then rotates to a position in the meter housing where it can be easily observed. The movement of violation indicator lever 70 urges time expired lever 72 to turn on shaft 74 to a concealed position within indicator chamber 20. When thus positioned, finger 76, attached to said lever 74, co-acts with outwardly extending ridge 78 of winding wheel 56. When spring 62 urges lever 32 to be returned to its original position after the winding wheel has been turned, lever 64 is again depressed with coil box 42 and violation lever 70 is rotated to a concealed position within indicator chamber 20. Because finger 76 is positioned against ridge 78, time expired lever 72 remains in a concealed position until wheel 56 rotates to a position which allows finger 76 to pass through an opening in ridge 78 whereupon lever 72 is urged with spring 80 to a visable position within the indicator chamber. This occurs when the allowable parking time indicated by the meter has expired.

When winding wheel 56 is rotated, clock spring 60 is wound to activate the meter's clock. Spring 60 drives shaft 58 and connected gear 82 which in turn drives a reduction gear chain to activate a conventional clock escapement mechanism shown in FIG. 7 as pallet fork 84, journaled on shaft 86 within timing chamber 22 to co-act at one end with roller pin 87 secured to balance wheel 8 which is oscillated with hair spring 90, and to co-act at its pallet pin end 91 with escape wheel 92 driven with small gear 94 by said reduction gear chain.

In a conventional timing mechanism each of the gears in the drive chain are journaled at a fixed position within the timing chamber to be in a proper driving relationship at all times with the other gears in the chain. In the reset device of this invention at least one gear in the drive chain is mounted so that it can be moved away from its driven gear thereby allowing the main drive gear 82 to freely rotate without driving the clock timing mechanism. For example, in the gear chain shown in FIG. 7, gear 82 drives gears 96 and 98 on shaft 100, gear 98 drives gears 102 and 104 on shaft 106, and gear 104 drives gears 108 and 110 on shaft 112. Shaft 112 also supports mounting block 114 to which lever 116 is secured and to which gears 118 and 120 are journaled with shaft 121. Gear 118 is driven with gear 110 while gear 120 drives small gear 94 secured to escape wheel 92 when lever 116 is properly positioned. Bellows 122 is mounted to the timing chamber 22 in such a manner so that plunger 124 of said bellows co-acts with one end of lever 116 to rotate it on shaft 112 when a predetermined pressure impulse is applied to the bellows through tube 16. As shown in FIG. 8, when said lever is thus rotated gear 120 moves out of driving relationship with small gear 94 whereby allowing gear 120 to freely rotate and unwind clock spring 60. Stop 128 is secured to wall 28 to check the movement of lever 116 as it is rotated on shaft 112. When plunger 124 is retracted into bellows 122, lever 116 turns on shaft 112 when a rotational force is applied to gear 108 with gear 104, to once again move gear 120 in driving relationship with gear 94. By properly balancing lever 116 with weighted end 130 this result is insured.

In operating the reset mechanism of this invention, a pressure impulse passes through tube 16 to bellows 122 thereby urging plunger 124 to co-act with an end of lever 116 to rotate said lever on shaft 112 and move drive gear 120 out of driving relationship with small gear 94 thus allowing clock spring 60 to unwind. Once the pressure impulse is removed from bellows 122 plunger 124 moves back into the bellows allowing lever 116 to rotate gear 120 into driving contact with gear 94 when main spring 60 is rewound.

It is to be noted that it is within the scope of this invention to move any of the gears within the clock mechanism out of driving relationship thereby allowing the meter's clock to run down. This may be done through the use of a lever as herein described or through the use of other repositioning devices.

We claim:

1. In a parking meter having a clock escapement mechanism driven with a clock spring when said spring is wound, means for unwinding said clock spring which comprises first gear means mounted in said parking meter and driven with said clock spring for transmitting the stored energy of said wound clock spring to second drive gear means for driving said clock escapement mechanism, mounted in said parking meter in coacting relationship with said first drive gear means to be driven therewith, and positioning means connected to said first drive gear means for moving said first drive gear means out of driving contact with said second drive gear means whereupon said first drive gear means is freely rotated by said clock spring and said clock spring is unwound.

2. The combination of claim 1 wherein said positioning means comprises a lever pivotally mounted within said parking meter having said first drive gear means journaled thereto in coacting relationship with said second drive gear means and lever activation means secured to said parking meter to coact with said lever and rotate said lever about its pivot point to move said first drive gear means out of a driving relationship with said second drive gear means.

3. The combination of claim 2 wherein said lever activation means comprises a bellows.

4. The combination of claims 3 wherein said lever is pivotally mounted to a gear shaft which has third drive gear means, driven by said clock spring, also journaled to said gear shaft for driving said first drive gear means.

5. The combination of claim 2 wherein repositioning means are secured to said lever for urging said lever to move said first drive gear means into driven contact with said second drive gear means when said clock spring is wound.

References Cited
UNITED STATES PATENTS

| | | | |
|---|---|---|---|
| 2,359,754 | 10/1944 | Fink | 58—141 |
| 3,178,880 | 4/1965 | Hodge | 58—142 |

RICHARD B. WILKINSON, Primary Examiner

EDITH C. SIMMONS, Assistant Examiner